March 22, 1966    E. H. TORSON    3,241,524
ANIMAL FEED-SUPPLEMENT BLOCK-HOLDER
Filed May 6, 1964    2 Sheets-Sheet 2

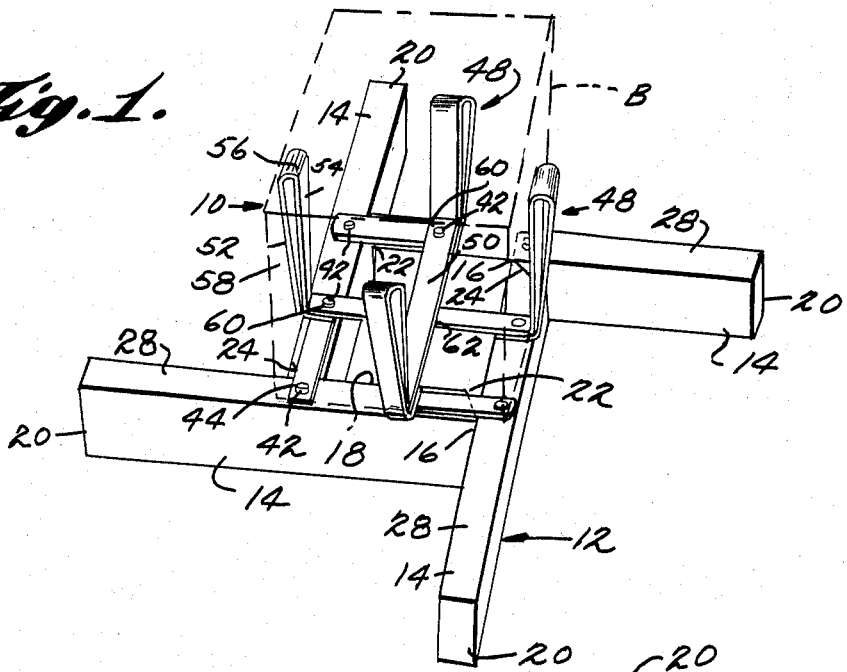

INVENTOR
EUGENE H. TORSON
BY Cushman, Darby & Cushman
ATTORNEYS

United States Patent Office 3,241,524
Patented Mar. 22, 1966

3,241,524
ANIMAL FEED-SUPPLEMENT BLOCK-HOLDER
Eugene H. Torson, R.R., West Union, Iowa
Filed May 6, 1964, Ser. No. 365,406
8 Claims. (Cl. 119—51)

The present invention relates to animal feeding apparatus and more particularly to improved means for supporting blocks of feed-supplement materials such as minerals, salts, protein derivatives or the like in position for feeding accessibility by such animals as cows, horses, hogs, sheep or the like.

Apparatus of the type to which the present invention is addressed are most usually employed in outdoor or indoor animal feeding or ranging areas so that the animals may at their pleasure lick food supplement therefrom, these supplements being necessary to the maintenance of health and well being in the animals. The principal major difficulties incumbent in the constructions commercially available for block holding include the difficulty of preventing the animals from tipping the apparatus over; the bulkiness of the apparatus which increases shipping costs as well as transportation problems in the feed lot; the durability of the apparatus, its ability to securely hold a block even when the size of the block has decreased because of feeding and weathering, its ability to accept standard sized blocks of any supplement and its capability of holding a block in position for easy access by the desired animals without having a substantial capacity to injure the animals' tongues, mouth or head area.

Accordingly it is an important object of the present invention to provide inexpensive apparatus of the character described which effectively overcomes each of the principal objectionable features found in prior art constructions just noted.

A specific object of the invention is the provision of a feed-supplement block-holder which is foldable for easy shipment and efficient portability and which unfolds to a feeding position in which the feed supplement block is easily and safely accessible to animals and effectively resists being tipped over.

These and further objects of the invention will become increasingly apparent during the following detailed explanation of the principles of the present invention, specific reference being made therein to the attached drawing in which two preferred embodiments of the present invention are illustrated. The embodiments shown should not be interpreted in a limiting sense, but merely as exemplifying the principles of the invention so that they might be explained with greater clarity and facility.

In the drawing:

FIGURE 1 is a perspective view of a collapsible feed-supplement block-holder according to the present invention, shown in its open, block holding position; a feed supplement block being illustrated in dashed lines so as to not obscure the understanding of the portions of the apparatus that would otherwise be hidden by the block;

FIGURE 2 is a bottom plan view of the block holder of FIGURE 1;

Figure 3:
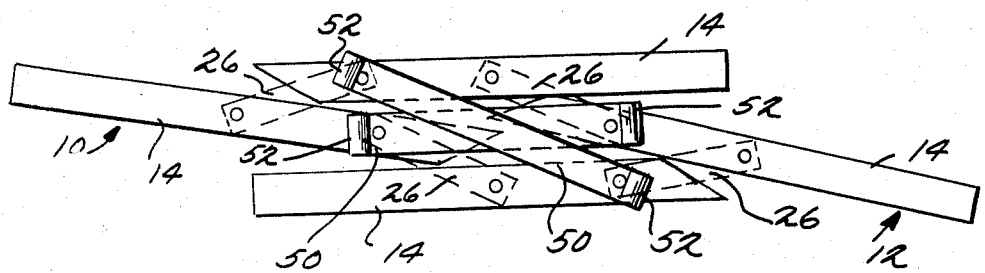
FIGURE 3 is a top plan view of the block-holder of FIGURE 1 shown in its folded position.

Now with more particular reference to the drawing, the block-holder 10 shown in FIGURES 1–3 preferably comprises a base portion 12 in the form of four elongated generally horizontally extending feet 14 arranged so that one end 16 of each foot 14 abuts one adjacent foot intermediate its ends for instance near the midpoints of the feet 14 as shown. The base 12 as shown in its open position in FIGURE 1 resembles a pin wheel having a generally square opening 18 therethrough in its central area. The outer, free ends 20 of the feet 14 project a substantial distance outwardly from the square 18, so as to greatly add to the stability of the block holder.

As shown the inner ends 16 of two of the feet 14 forming two opposing sides of the square 18 are cut away along approximate 45 degree lines 22 facing toward the square 18, and the inner ends 16 of the other two feet 14 which form opposing sides of the square 18 are cut away along approximate 45 degree lines 24 facing away from the square 18 to facilitate collapsing of the block holder as more fully described hereinafter.

The feet 14 are retained in association with one another by metal straps 26 which extend between the upper surfaces 28 of adjacent feet as shown in FIGURE 1 and between the lower surfaces 30 of adjacent feet as shown in FIGURE 2. Each strap 26 has an opening 32, 34 formed therethrough adjacent each end of the strap and each strap 26 is positioned so as to extend between the intermediate portion of one foot 14 and a point 36 on an adjacent foot 14 spaced from its end 16 by an amount sufficient that one strap opening 34 is located at the midpoint 38 of a side of the square 18.

The straps 26 are held in position at one end by bolts 40 which pass generally vertically through the feet intermediate portions and through the openings 32 in the straps 26 on the top and bottom surfaces of the feet 14. Fasteners, such as nuts 42 threaded onto the bolts 40 retain the bolts in place. The threaded ends of the bolts 40 may be peened as at 44 to retain the nuts thereon. The joints formed by the bolts 40 are preferably loose enough to allow the pivoting of the straps 26 about these bolts.

At their other ends the straps 26 are held in position by bolts 46 which pass generally vertically through the feet 14 at the points 38 and through the openings 34 in the straps 26 both on the upper and lower surfaces of the feet 14. Like the bolts 40, the bolts 46 are retained in place by peened on nuts 42 or other suitable fasteners. This last mentioned joint is also preferably made up somewhat loosely so as to allow pivoting of the straps 26 about the bolts 46.

The block-holding portions of the holder 10 include two similar metal straps 48. Each strap 48 includes a generally horizontal central portion 50 and a generally vertically directed loop 52 integrally extending from each end of its central portion 50. The loops 52 are preferably formed by bending the strap upwardly, outwardly and then downwardly so that each loop 52 comprises an upward and slightly inwardly directed portion 54, an upwardly convex curved portion 56 and a generally downwardly directed portion 58 which preferably terminates approximately evenly with the central portion 50 of the strap 48. Adjacent the ends of the central strap portion 50 of each strap 48 openings 60 are formed therethrough which are spaced from one another by an amount substantially equal to the distance between bolts 46 at opposite sides of the square 18.

Accordingly one strap 48 is secured to the base 12 by bolts 46 on two of the opposing square sides and the other strap 48 is secured to the base 12 by bolts 46 on the other two opposing square sides so that when the holder is in its open position as shown in FIGURES 1 and 2, the central portions 50, two straps 48 lie at generally right angles to one another in a generally horizontal plane and the two straps 48 cross one another near the midpoints of their central portions 50. To prevent binding of the straps 48 during opening and collapsing of the holder 10, one of the strap central portions, for instance the upper one may be bowed slightly away from the other strap 48 as at 62. To further facilitate the opening and collapsing of the holder 10, means such as plastic, fiber or metal washers may be suitably carried on bolts 40, 46 between parts which rotate with respect to one another.

It can now be seen that the novel block holder of the invention can be easily brought from the open position thereof shown in FIGURE 1 to the closed position shown in FIGURE 3 by grasping any two adjacent feet 14 having a joint between them which includes an inwardly facing relieved portion 22 and rotating the outer ends of these feet away from one another. Likewise the holder 10 can be brought from its collapsed condition (FIGURE 3) to its open position (FIGURE 1) by simply rotating the ends just mentioned toward one another until they extend at a generally right angle.

When the block holder is in its open position a food supplement block B is easily received between the loops 52 so as to rest on the central portions 50. The straps 48 as well as the other metallic portions of the block holder 10 are preferably formed from a non-corroding material such as stainless steel. It is preferred that the loop upwardly and slightly inwardly directed portions 54 be arranged to resiliently bias against the block B so that a fresh block B forces the loops outwardly, especially near the upper ends of the loops. As the block is consumed by the animals and weathers the loops 52 by virtue of their resilient biasing continue to contact the block until it has gotten substantially smaller. Thereafter, the fact that the block is "caged" between the four loops 52 results in the block being positioned for use as the block continues to be consumed.

The loops 52 not only provide effective, resilient means for holding a block B, but additionally by virtue of the fact that they present no upwardly or outwardly directed prongs or stakes as do many prior art holders, accidental self-harm to animals' tongues, faces, etc. is effectively prevented. This is especially important when the holder is to be used to feed animals that tend to be inquisitive or who jostle one another when feeding.

A modification of the invention is shown in FIGURE 3 which illustrates a less expensive holder 10'. Its base 12' simply includes four feet 14' arranged with respect to one another in a manner similar to that of the feet 14 in the FIGURES 1–3 embodiment. However, the inner ends 16' are preferably cut squarely rather than angularly so that the ends 16' squarely abut the sides 100 of adjacent feet 14'.

In this second embodiment the straps 26, bolts 40, 46 and nuts 42 have been eliminated, the feet 14' being held in position by a plurality of fasteners such as lag screws 102. As shown two vertically spaced lag screws 102 pass transversely through each foot 14' intermediate the ends thereof and into the end 16' of each adjacent foot 14'. The block holding portions 48' of the holder 10' may be identical with that shown in FIGURES 1–3, however in FIGURE 4 a slight modification is shown inasmuch as the lower ends 104 of the downwardly directed portions 58' of the loops 52' are bent inwardly so as to underlie the strap central portions 50' and have openings 106 therethrough, through which suitable fasteners such as lag screws 108 pass to secure the straps 48' to the base 12'. The inward turning of the lower ends 104 further prevent injury to animals since they are inaccessable to animal tongues, etc.

Figure 4:
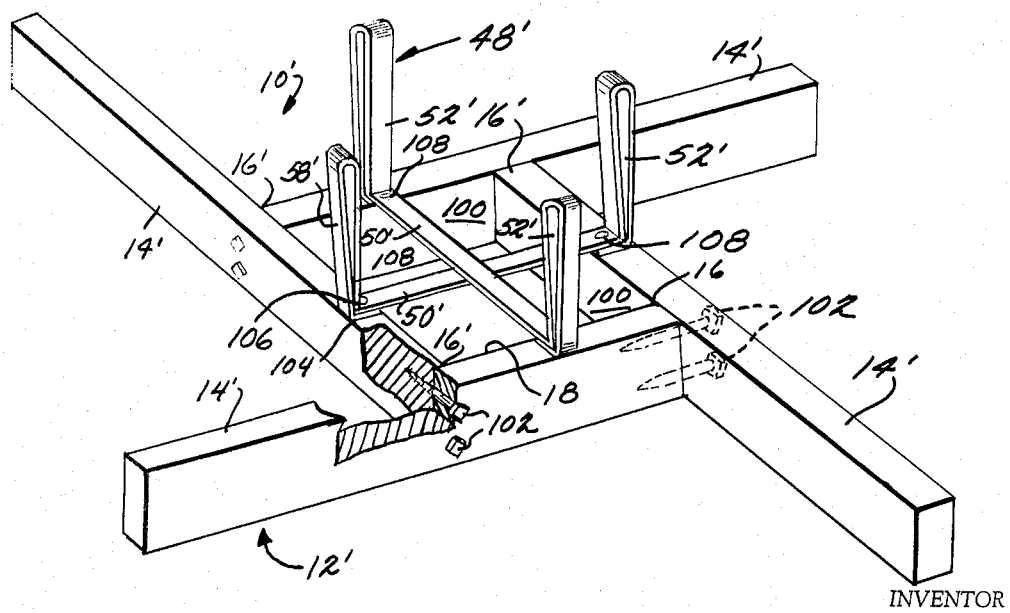
FIGURE 4 is a fragmentary perspective view illustrating a modified form of the invention.

The FIGURE 4 embodiment can conveniently be stored and delivered in a collapsed condition by the removal of the screws 102 and the rotating of the feet 14' so that they are all generally parallel to one another as are the feet 14 in FIGURE 3.

It should be apparent that whereas particular fasteners such as bolts and lag screws are preferred and have been shown in some cases they may be replaced by equivalent fastening means such as rivets, nails, wires or the like.

Although the feet 14, 14' have been shown composed of wood, it is within the purview of this invention that they might optionally comprise metallic means such as aluminum tubing or combinations of wood, metal or plastic or the like.

It should now be apparent that the embodiments of the block holder according to the invention have been described with sufficient particularity that they can be seen to fully accomplish the objects of the invention as set forth hereinabove. Inasmuch as many modifications may be made to the embodiments depicted without departing from the principles of this invention it is intended that the scope of the invention be limited only by the spirit and scope of the following claims.

I claim:

1. An animal feed-supplement block-holder comprising: a base portion including four elongated generally horizontally directed feet arranged with respect to one another so that a first end of each foot lies adjacent a portion of one other of the feet intermediate the ends of said other foot, the portions of the feet extending between said first ends and said intermediate portions generally defining a closed four sided geometric figure including two pairs of opposed sides; and block holding strap means secured by securing means to and extending between the midpoints of both of said opposing side pairs, each of said block-holding strap means including a generally horizontally directed central portion and two upwardly, slightly inwardly directed resilient portions joined to each central portion at the ends thereof, the block-holding straps each also including an outwardly directed upwardly convex curved strap portion integrally extending from the upper end of its upwardly, sligthly inwardly directed portion and a downwardly directed strap portion extending from the curved portion, the downwardly directed strap portion terminating approximately evenly with the generally horizontal central portion of the associated block-holding strap, said block-holding strap means upwardly, slightly inwardly directed resilient portions being arranged to frictionally receive a feed supplement block therebetween for easy acess by animals.

2. Apparatus as set forth in claim 1 wherein the straps are essentially composed of stainless steel.

3. Apparatus as set forth in claim 2 wherein the feet of the base portion are essentially composed of wood.

4. An animal feed-supplement block-holder comprising: a base portion including four elongated generally horizontally directed feet arranged with respect to one another so that a first end of each foot lies adjacent a portion of one other of the feet intermediate the ends of said other foot, the first end of each foot is pivotal with respect to the intermediate portion of each adjacent other foot, the portions of the feet extending between said first ends and said intermediate portions generally defining a closed four sided geometric figure including two pairs of opposed sides; and block holding strap means secured by securing means to and extending between the midpoints of both of said opposing side pairs, each of said block-holding strap means including a generally horizontally directed central portion and two upwardly, slightly inwardly directed resilient portions joined to each central portion at the ends thereof, said block-holding strap means upwardly, slightly inwardly directed resilient portions being arranged to frictionally receive a feed supplement block therebetween for easy access by animals.

5. Apparatus as set forth in claim 4 including pivoting means provided between each foot first end and each adjacent other foot intermediate portion, said pivoting means including four straps each pivotally joined at one end to the upper surface of the intermediate portion of one foot and pivotally joined at the other end to the upper surface of one foot adjacent the just mentioned foot near the first end thereof and including four straps each pivotally joined at one end to the lower surface of the intermediate portion of one foot and pivotally joined at the other end to the lower surface of one foot adjacent the just mentioned foot near the first end thereof.

6. Apparatus as set forth in claim 5 wherein the pivoting means straps are essentially composed of stainless steel.

7. Apparatus as set forth in claim 5 wherein the other ends of the pivoting means straps are pivotally carried on the block-holding strap securing means.

8. Apparatus as set forth in claim 1 wherein each downwardly directed strap portion has a lower end thereon including a short portion adjacent said lower end directed inwardly so that said lower end an the short portion underlie the generally horizontal central portion of the associated block-holding strap thus precluding injury to animals by said block-holding strap ends.

References Cited by the Examiner
UNITED STATES PATENTS

| | | | |
|---|---|---|---|
| 1,786,777 | 12/1930 | Pfeiffer | 119—51 |
| 2,030,775 | 2/1936 | Twiss | 248—149 |
| 2,750,138 | 6/1956 | Morris | 248—44 |

SAMUEL KOREN, *Primary Examiner.*

HUGH R. CHAMBLEE, *Examiner.*